(12) United States Patent  
Oikawa

(10) Patent No.: US 10,915,454 B2  
(45) Date of Patent: Feb. 9, 2021

(54) MEMORY DEVICE AND CACHE CONTROL METHOD

(71) Applicant: Toshiba Memory Corporation, Tokyo (JP)

(72) Inventor: Kohei Oikawa, Kawasaki Kanagawa (JP)

(73) Assignee: TOSHIBA MEMORY CORPORATION, Tokyo (JP)

(*) Notice: Subject to any disclaimer, the term of this patent is extended or adjusted under 35 U.S.C. 154(b) by 0 days.

(21) Appl. No.: 16/556,050

(22) Filed: Aug. 29, 2019

(65) Prior Publication Data

US 2020/0285585 A1 Sep. 10, 2020

(30) Foreign Application Priority Data

Mar. 5, 2019 (JP) ................................. 2019-039727

(51) Int. Cl.
| | | |
|---|---|---|
| G06F 12/00 | (2006.01) | |
| G06F 13/00 | (2006.01) | |
| G06F 12/0895 | (2016.01) | |
| G06F 12/02 | (2006.01) | |
| G06F 13/16 | (2006.01) | |

(52) U.S. Cl.
CPC ...... *G06F 12/0895* (2013.01); *G06F 12/0246* (2013.01); *G06F 12/0292* (2013.01); *G06F 13/1673* (2013.01); *G06F 2212/7201* (2013.01)

(58) Field of Classification Search
CPC ............. G06F 12/0895; G06F 12/0246; G06F 12/0292; G06F 13/1673; G06F 2212/7201
See application file for complete search history.

(56) References Cited

U.S. PATENT DOCUMENTS

| | | | |
|---|---|---|---|
| 8,429,339 B2 | 4/2013 | Oikawa | |
| 9,423,979 B2 | 8/2016 | Oikawa | |
| 2004/0128470 A1 | 7/2004 | Hetzler et al. | |
| 2012/0215970 A1 | 8/2012 | Shats | |
| 2014/0181375 A1* | 6/2014 | Miyamoto | .......... G06F 12/0246 711/103 |
| 2016/0147594 A1* | 5/2016 | Walker | ................ G06F 12/0246 714/773 |
| 2017/0177497 A1 | 6/2017 | Chun et al. | |
| 2018/0032272 A1 | 2/2018 | Sato | |

(Continued)

OTHER PUBLICATIONS

U.S. Appl. No. 16/119,713.

*Primary Examiner* — Sean D Rossiter
(74) *Attorney, Agent, or Firm* — Kim & Stewart LLP

(57) ABSTRACT

A memory device includes a non-volatile first memory in which a conversion table is stored, a second memory, and a controller configured to control the first memory and the second memory, and including a cache control circuit. The cache control circuit is configured to set up a circular buffer with a write pointer, and store portions of the conversion table in the circular buffer. Each of the portions of the conversion table contain a plurality of logical address to physical address mappings, and each of the portions have a corresponding entry in a management table stored in the second memory, and each entry of the management table includes an address field for storing an address of the circular buffer used in locating the corresponding portion of the conversion table and a size field for storing a size of the corresponding portion.

20 Claims, 9 Drawing Sheets

(56) References Cited

U.S. PATENT DOCUMENTS

| | | | |
|---|---|---|---|
| 2018/0232328 A1* | 8/2018 | Lassen | G06F 13/1673 |
| 2019/0095133 A1* | 3/2019 | Grannaes | G06F 12/0246 |
| 2020/0192815 A1* | 6/2020 | Lee | G06F 12/1009 |
| 2020/0241943 A1* | 7/2020 | Dimond | G06F 9/542 |

* cited by examiner

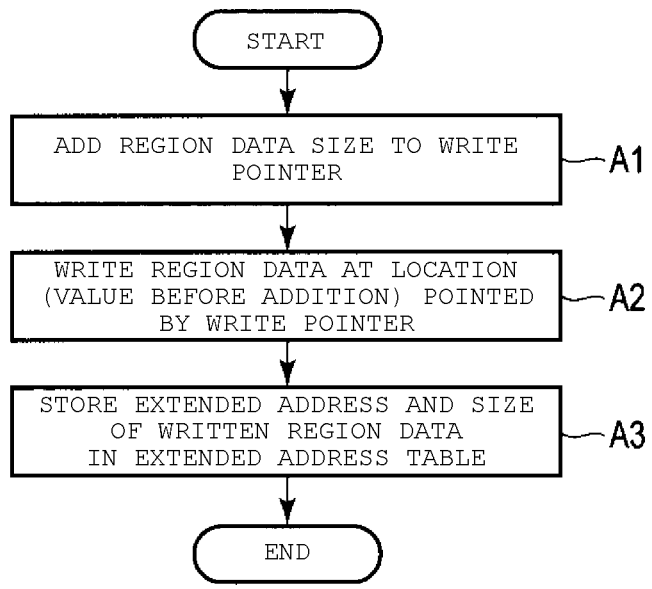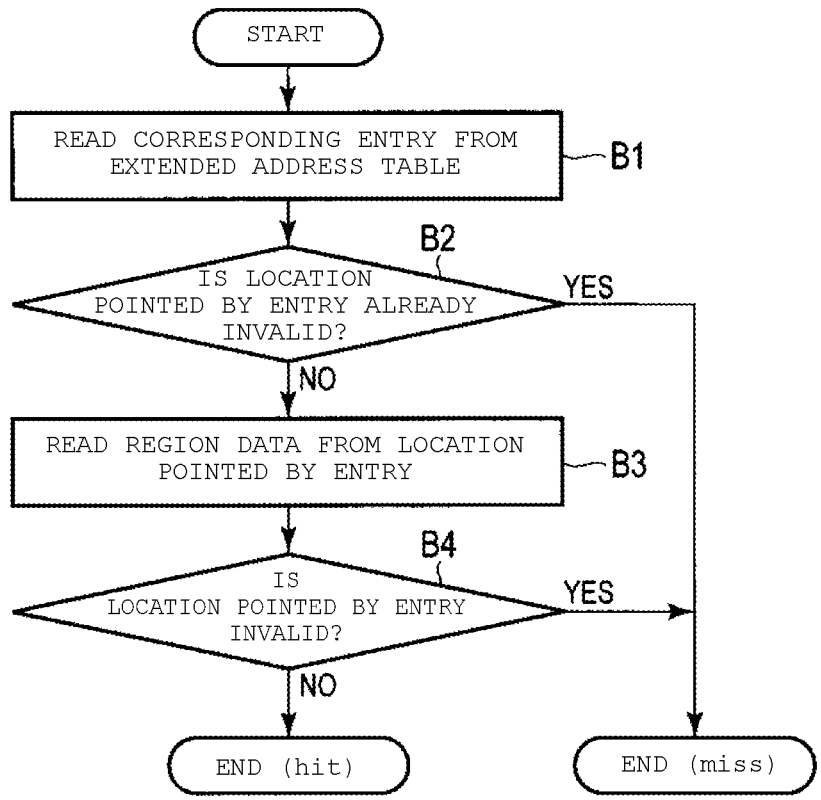

MEMORY DEVICE AND CACHE CONTROL METHOD

CROSS-REFERENCE TO RELATED APPLICATION

This application is based upon and claims the benefit of priority from Japanese Patent Application No. 2019-039727, filed Mar. 5, 2019, the entire contents of which are incorporated herein by reference.

FIELD

Embodiments described herein relate generally to a memory device and a cache control method.

BACKGROUND

In a memory device such as a solid state drive (SSD), for example, caching of temporarily storing in DRAM a part of data which is read from NAND flash memory and which is to be written into NAND flash memory is performed.

DESCRIPTION OF THE DRAWINGS

FIG. 5 shows a flowchart illustrating a flow of region data addition processing in the memory device according to the first embodiment.

FIG. 6 shows a flowchart illustrating a flow of reference processing in the memory device according to the first embodiment.

DETAILED DESCRIPTION

Embodiments provide a memory device and a cache control method that can reduce the overhead of the cache control.

In general, according to one embodiment, a memory device includes a non-volatile first memory in which a conversion table is stored, a second memory, and a controller configured to control the first memory and the second memory, and including a cache control circuit. The cache control circuit is configured to set up a circular buffer with a write pointer, and store portions of the conversion table in the circular buffer. Each of the portions of the conversion table contain a plurality of logical address to physical address mappings, and each of the portions have a corresponding entry in a management table stored in the second memory, and each entry of the management table includes an address field for storing an address of the circular buffer used in locating the corresponding portion of the conversion table and a size field for storing a size of the corresponding portion.

First Embodiment

First, a first embodiment will be described.

Figure 1:
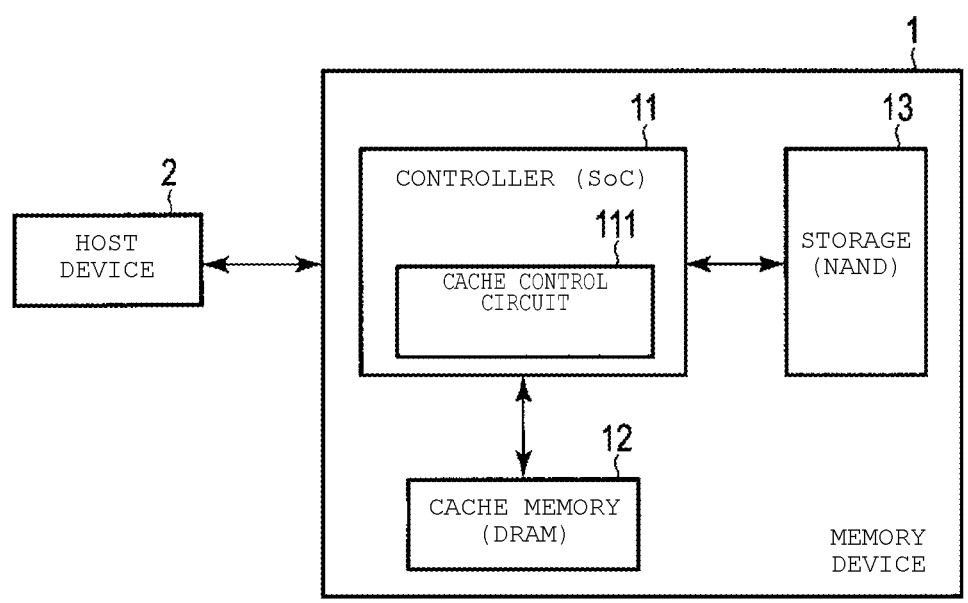
FIG. 1 shows a diagram illustrating a configuration example and a connection example of a memory device according to a first embodiment.

FIG. 1 shows a diagram illustrating a configuration example and a connection example of a memory device according to the present embodiment.

A memory device 1 is connected to a host 2 through an interface such as PCIe®, for example. The memory device 1 receives a command from the host 2, executes a processing corresponding to the command, and transmits the processing result to the host 2. The command that the memory device 1 receives includes at least a write command requesting data writing and a read command requesting data reading.

The memory device 1 has a controller 11 implemented as a system on a chip (SoC) or the like, for example, a cache memory 12 such as a DRAM or the like, for example, and a storage 13 such as a NAND flash memory or the like, for example. The controller 11 executes a write operation of data into the storage 13 and a read operation of data from the storage 13, using the cache memory 12 as a region for temporarily storing data. The controller 11 has a cache control circuit 111 for a logical-to-physical address (logical address to physical address) conversion table. The cache control circuit 111 may be implemented by the execution of a program stored in a memory incorporated in the controller 11 by a processor incorporated in the controller 11. Alternatively, the cache control circuit 111 may be implemented by an electrical circuit. That is, the cache control circuit 111 may be implemented by software or may be implemented by hardware. The cache control circuit 111 will be described below.

The host 2 issuing the write command and the read command to the memory device 1 specifies a location in the region of the storage 13 with a logical address. The controller 11 manages the logical address specified by the host 2 and a physical address representing the physical location at which data corresponding to the logical address is stored in the storage 13. The logical address is in a logical address space, and the physical address is in a physical address space. When the host 2 requests the memory device 1 to write data by a write command, for example, the host 2 does not need to know what physical location in the storage 13 the data is to be written since the logical address space is associated with the physical address space under the control of the controller 11. Similarly, even when requesting the memory device 1 to read data by a read command, for example, the host 2 does not need to know what location in the storage 13 the data is stored. That is, the host 2 does not need to know how the physical storage region provided by the memory device 1 is configured, for example.

Figure 2:
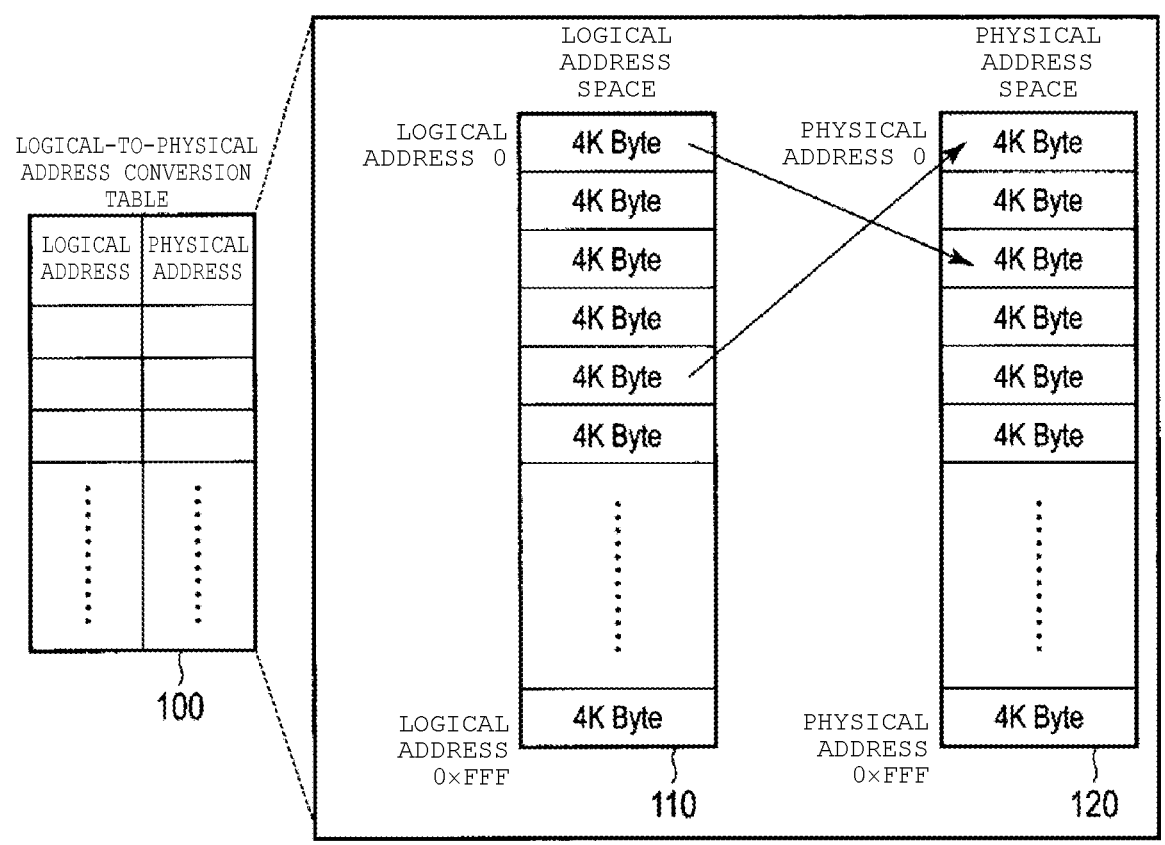
FIG. 2 shows a conceptual diagram illustrating a logical-to-physical conversion table and a correspondence between a logical address space and a physical address space.

The controller 11 creates and maintains the logical-to-physical address conversion table for converting the logical address into the physical address and uses the logical-to-physical address conversion table to convert the logical address into the physical address so as to associate the logical address space with the physical address space. FIG. 2 shows a conceptual diagram illustrating the logical-to-physical address conversion table 100 and an association of the logical address space 110 with the physical address space 120 by the logical-to-physical address conversion table 100. As shown in FIG. 2, the logical-to-physical address conversion table 100 represents the relationship between the logical address and the physical address. In the example of FIG. 2, the region of storage 13 is divided into 4K Byte units to each of which an address is assigned, the arrows drawn from the logical address space 110 side to the physical address space 120 side illustrates that the logical address at the start of the arrow and the physical address at the end are associated with each other, and the association of these two addresses is stored in the logical-to-physical address conversion table 100. Using the logical-to-physical address conversion table 100, the controller 11 performs conversion between the logical address and the physical address.

The controller 11 stores the logical-to-physical address conversion table 100 in the storage 13. Further, the controller 11 executes caching to temporarily store a part of the logical-to-physical address conversion table 100 in the cache memory 12, for example. The region used in the caching of the logical-to-physical address conversion table 100 is not limited to the cache memory 12 and may be a memory incorporated in the controller 11, for example. Hereinafter, the region used in the caching of the logical-to-physical address conversion table 100 may simply be referred to as a cache. The cache control circuit 111 is a module controlling the caching of the logical-to-physical address conversion table 100. Here, it is assumed that the contents of the logical-to-physical address conversion table 100 in the cache matches the contents of the logical-to-physical address conversion table 100 in the storage 13. When part of the contents of the cached logical-to-physical address conversion table 100 is changed, the logical-to-physical address conversion table 100 in the storage 13 is updated and the part of the logical-to-physical address conversion table 100 after the update is stored in the cache again.

The size of the logical-to-physical address conversion table 100 tends to get larger in proportion to the increased capacity of the storage 13. As the capacity of the storage 13 increases, the size of the logical-to-physical address conversion table 100 increases, and the size of the cache memory 12 for caching the logical-to-physical address conversion table 100 increases so that a problem arises that the power consumption and the price of the memory device 1 increase. To resolve this problem, a method of caching the logical-to-physical address conversion table 100 into cache memory 12 has been considered. Further, a method of managing compressed contents in the cache has also been considered. However, additional cache control is necessary for variable-length compression data because the typical cache is used for fixed-length data. Further, since short response time is required of the memory device 1, it is desired that the overhead of cache control is small.

Therefore, the cache control circuit 111 includes a mechanism that reduces the overhead of cache control, and this will be described in detail below.

Here, caching of the logical-to-physical address conversion table 100 is given as an example to describe cache control, and the method of cache control described herein is not limited to the logical-to-physical address conversion table and is applicable to the caching of various data. The method of cache control is suitable for caching data of variable length in particular.

Figure 3:
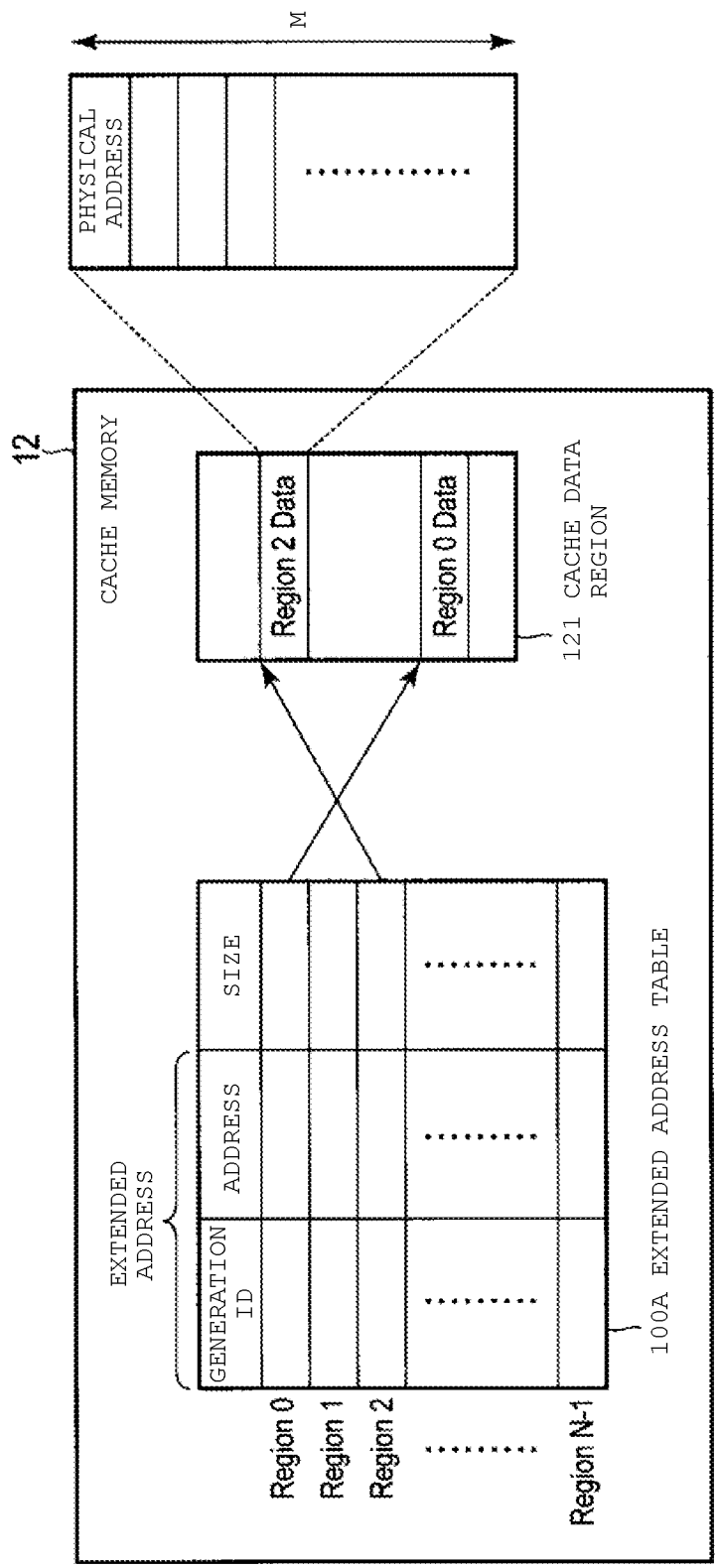
FIG. 3 shows a diagram illustrating a structure of data managed on a cache memory for caching the logical-to-physical address conversion table in the memory device according to the first embodiment.

FIG. 3 shows a diagram illustrating a structure of data that the cache control circuit 111 manages using the cache memory 12 for caching the logical-to-physical address conversion table 100. The configuration of data shown in FIG. 3 is an example of a case where the cache control circuit 111 is assumed to divide the logical-to-physical address conversion table 100 into N regions for cache management. The data chunk for each region (hereinafter referred to as "region data") includes M relationships between the logical address and the physical address. That is, the logical-to-physical address conversion table 100 contains the relationships between N×M logical addresses and N×M physical addresses.

As shown in FIG. 3, the cache control circuit 111 manages an extended address table 100A and a cache data region 121 in the cache memory 12.

Each of the N region data into which the logical-to-physical address conversion table 100 is divided is written in the cache data region 121 in the order they are added to the cache. The location on the cache data region 121 where the region data is written is managed by the extended address table 100A.

The extended address table 100A includes N entries, equal to the number of regions, that is, the number of region data, and each entry stores the information of extended address and size of the corresponding region data, which may be of variable length.

Figure 4:
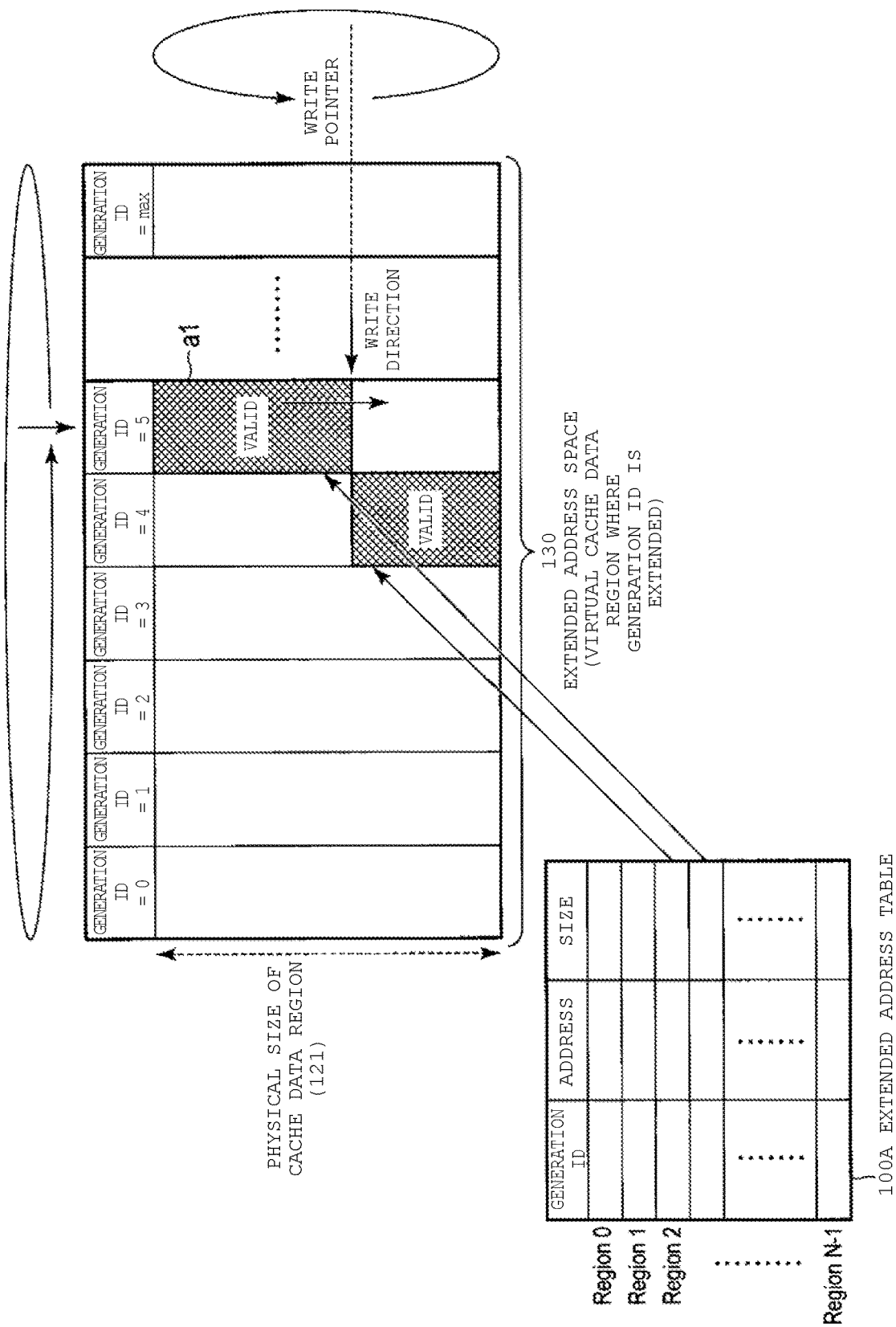
FIG. 4 is a diagram illustrating a concept of an extended address and a cache control using the extended address in the memory device according to the first embodiment.

FIG. 4 is a diagram illustrating the concept of extended address and a cache control using the extended address in the memory device 1 according to the first embodiment.

The extended address includes the address corresponding to the location in the cache data region 121 of the cache memory 12 and a generation ID which is added on an upper bit side thereof. The size of storing one generation of the extended address space denoted by the reference numeral 130 in FIG. 4 is equal to the size of a cache data region 121 physically assigned to the cache memory 12. The extended address space 130 is a virtually extended cache data region by using the generation ID.

In the cache control according to the present embodiment, a circular buffer with a write pointer and a generation ID is used. The write pointer is used to control the write location of the region data. The write pointer moves from the starting address toward the final address of a certain generation and, on reaching the final address, moves to the starting address of the next generation (generation ID: +1). Further, on reaching the final address of the last generation (generation ID=max), the write pointer wraps around to the starting address of the starting generation (generation ID=0).

Further, in the cache control according to the present embodiment, as shown in FIG. 4, the current location of the write pointer defines the valid region, which is shown as the second half of generation ID=4 and the first half of generation ID=5, and hatched with reference numeral a1.

Next, (1) region data addition processing, (2) reference processing, and (3) cleanup processing in the memory device 1 according to the present embodiment, executed by the cache control circuit 111 will be described.

(1) Region Data Addition Processing

First, region data addition processing will be described with reference to FIG. 5 together with FIG. 4.

The cache control circuit 111 adds to the write pointer the size of the region data to be added to the cache data region 121 (step A1). When the region data to be added to the cache is compressed, the region data is compressed in advance and the size of the compressed region data is added to the write pointer. When the compressed data is to be added to the cache, the length of the region data stored in the cache becomes variable even if the length of the region data before compression is of a fixed unit size.

Next, the cache control circuit 111 writes the region data at a current location pointed by the write pointer before the addition in the step A1 (step A2). Next, the cache control circuit 111 stores the extended address (value of write pointer before addition) and the size of the written region data in the corresponding entry of the extended address table 100A (step A3).

In the region data addition processing, the valid region a1 in the extended address space 130 shifts as the write pointer is moved. Therefore, there is a possibility that some of the data added before the valid region a1 becomes an invalid region.

(2) Reference Processing

Next, the reference processing will be described with reference to FIG. 6 together with FIG. 4.

The cache control circuit 111 reads the corresponding entry from the extended address table 100A (step B1). When the location pointed by the read entry is an invalid region (step B2: YES), the cache control circuit 111 determines the reference processing to be a miss (the specified region data is not in the cache). The processing of step B2 is not essential, but it is possible to make an early determination of a miss by the execution thereof.

When the location pointed by the read entry is a valid region a1 (step B2: NO), the cache control circuit 111 reads the region data from the location pointed by the entry (step B3). The cache control circuit 111 determines again whether or not the location pointed by the entry is in the valid region after reading (step B4). The cache control circuit 111 determines the processing to be a miss when the location is in the invalid region (step B4: YES), and to be a hit (the specified region data is in the cache) when the location is in the valid region a1 (step B4: NO).

The determination processing of the step B4 is performed after the step B3 so that consistency is maintained when the reference processing and the region data addition processing are executed concurrently. That is, since there is a possibility that the write pointer advances and the valid region a1 shifts while the region data is being read, consistency in determining a hit is ensured only when the pointed location is included in the valid region al even after reading. The cache control circuit 111 does not need to execute the step B4 after the step B3 when the reference processing and the region data addition processing are not executed concurrently.

(3) Cleanup Processing

Next, cleanup processing will be described with reference to FIG. 8 together with FIG. 7.

Figure 7:
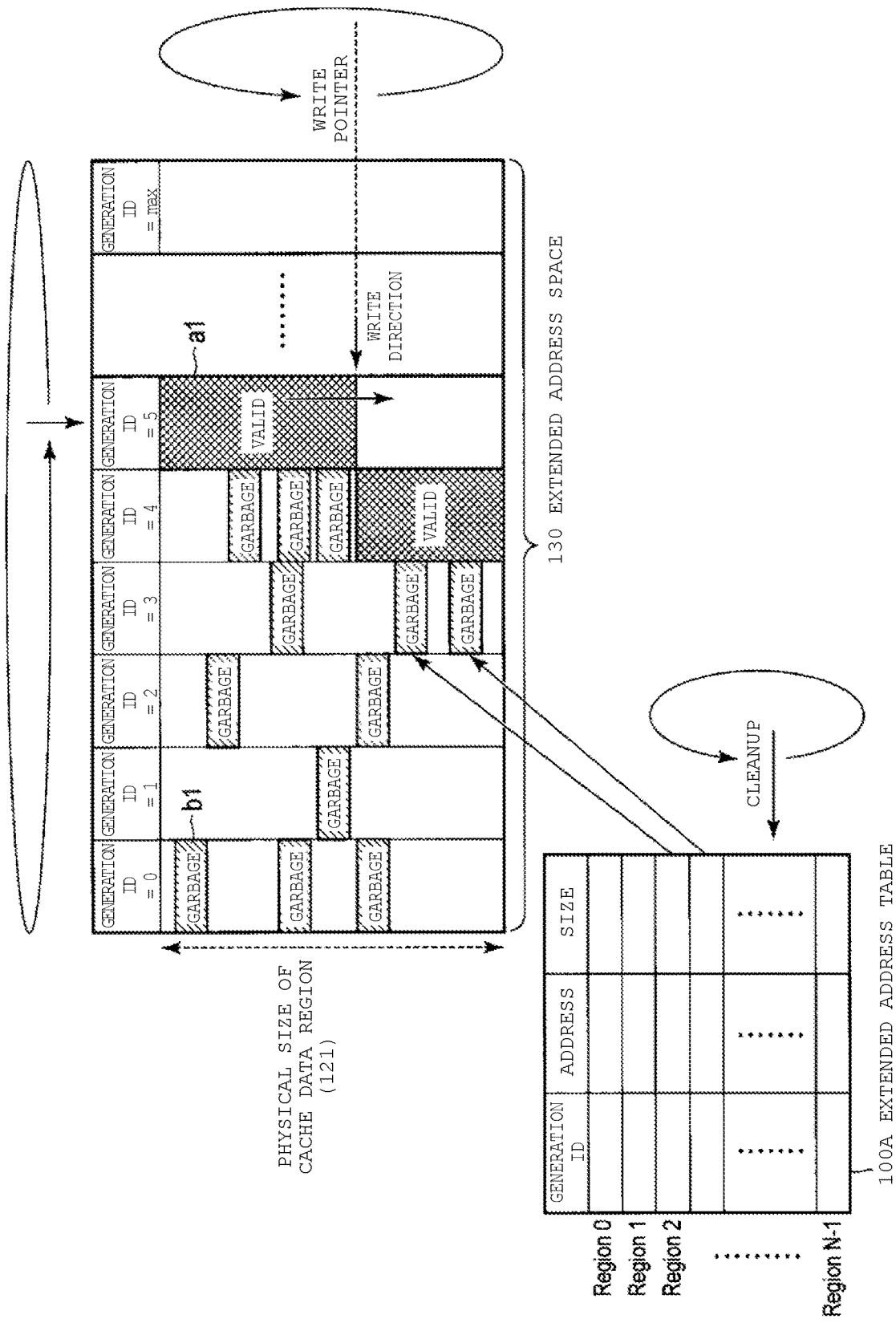
FIG. 7 is a diagram illustrating a cleanup processing in the memory device according to the first embodiment.

As shown in FIG. 7, the entries pointing to the invalid region in the table 100A increase as the write pointer advances. When the write pointer further advances to wrap around the extended address space 130, a region that was an invalid region turns into a valid region a1 again. Here, if the entry that pointed to an invalid region remains in the same state, this entry ends up being determined to be a hit in the reference processing despite being in a state of pointing to a region overwritten with another region data (the hatched region indicated by reference numeral b1). To prevent this situation, the entry pointing to the invalid region needs to be invalidated until the write pointer wraps around the extended address space 130. Specifically, each time the write pointer advances by a predetermined amount, one entry (or a predetermined number of entries) of the extended address table 100A is checked in turn. This processing is referred to as a cleanup processing.

Figure 8:
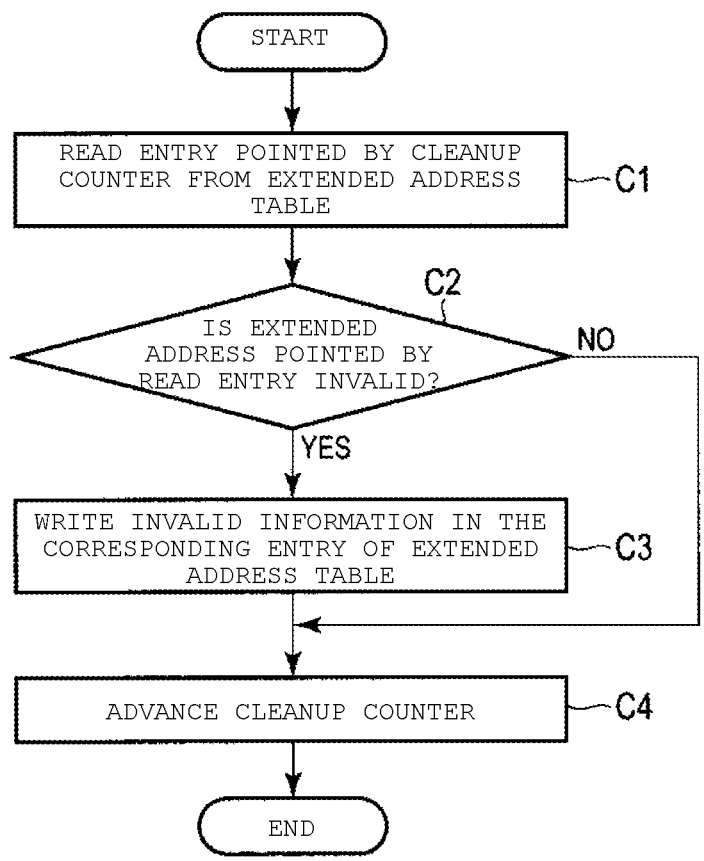
FIG. 8 shows a flowchart illustrating a flow of the cleanup processing in the memory device according to the first embodiment.

FIG. 8 shows a flow diagram of cleanup processing when one entry of the extended address table 100A is checked in turn each time the write pointer advances by a predetermined amount.

The cache control circuit 111 has a cleanup counter for cleanup processing. The cache control circuit 111 reads an entry pointed by the cleanup counter from the extended address table 100A (step C1) and checks the contents of the read entry (step C2).

When the extended address pointed by the entry is included in the invalid region (step C2: YES), the cache control circuit 111 writes a value representing an invalid state in the entry (step C3). The invalid state may be represented by setting the size field to zero, the address field to a non-existent address, or additional valid/invalid flag field. When the determination result of step C2 is No, or when the processing of step C3 ends, the cache control circuit 111 advances the cleanup counter by one (step C4).

Since the cleanup processing requires the write pointer to wrap around the extended address table 100A, each time the write pointer advances by (physical size of the data region)× (number of generations−1)/(number of regions), it is necessary to process at least one entry. When the generation ID is 1 bit (2 generations), it is necessary to execute cleanup frequently, and the bandwidth of the cache memory 12 storing the extended address table 100A increases. By increasing the generation ID to 10 bits (1024 generations), for example, it is possible to reduce the bandwidth required in the cleanup processing to approximately 1/512 of the bandwidth when the generation ID is 1 bit.

The number of bits of the generation ID may be any number, and if the number of bits of the generation ID increases, the size of the extended address table 100A increases and the size of the cache data region 121 disposed in the cache memory 12 of the memory device 1 becomes small with respect to the size of the extended address table 100A so that there is a possibility that the cache hit rate declines. Therefore, an upper limit of the number of bits of the generation ID may be determined based on a relationship between performance deterioration caused by a declining cache hit rate and performance deterioration caused by the reduced cleanup.

In the memory device 1 according to the present embodiment, both the region data addition processing and the reference processing can be realized by one-time access to the extended address table 100A and cache data region 121, and further, regarding additional cleanup processing, it is possible to substantially reduce the overhead for cache control by adjusting the generation ID.

In this way, the memory device 1 according to the present embodiment can reduce the overhead of the cache control.

Second Embodiment

Next, a second embodiment will be described. Like the first embodiment, a memory device 1 having the controller 11, the cache memory 12, and the storage 13 is assumed in the present embodiment as well. Here, the same reference numerals are used for the same components as in the first embodiment and descriptions about these will not be repeated.

Figure 9:
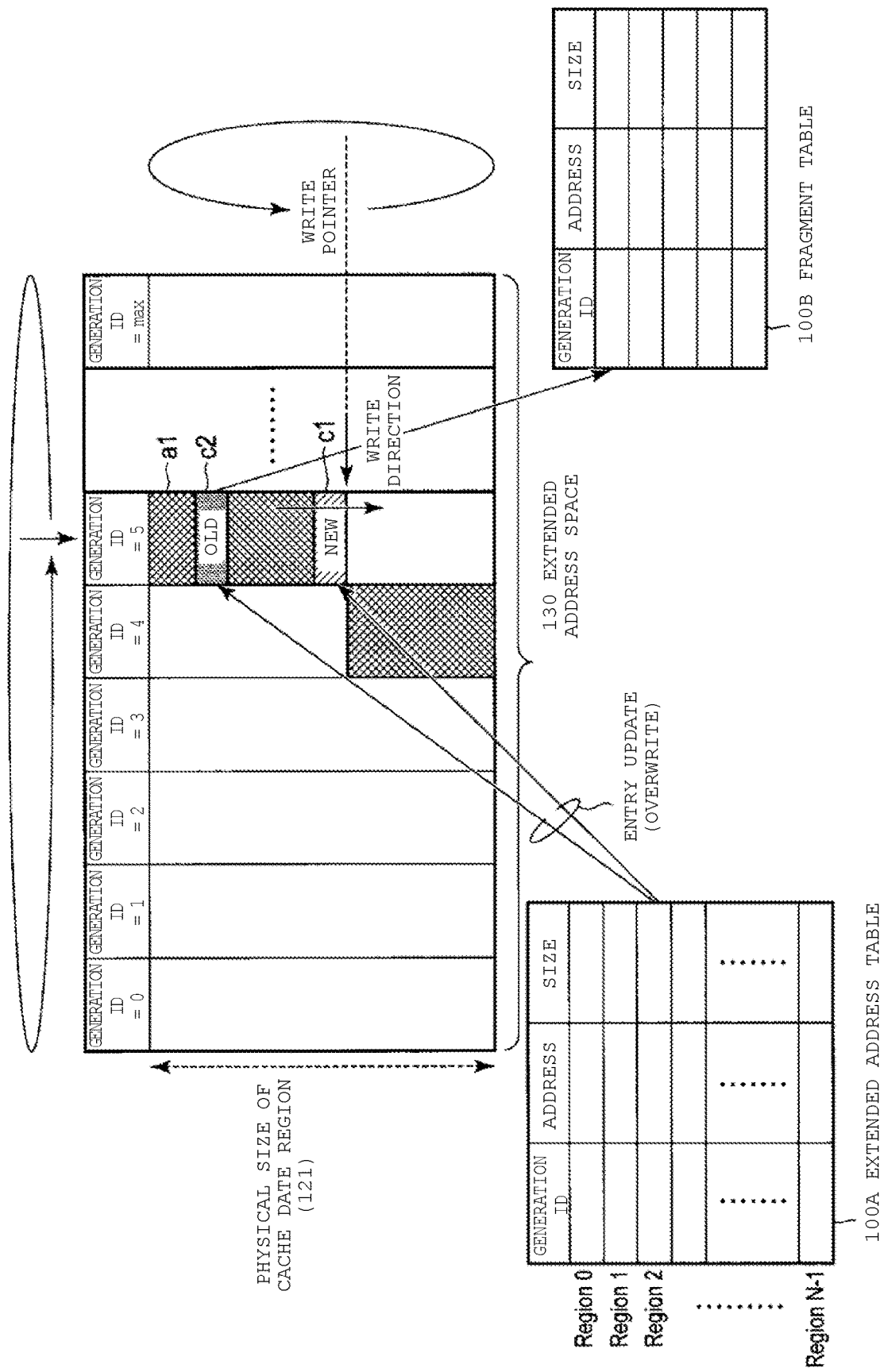
FIG. 9 shows a diagram for describing a problem which remains in the memory device according to the first embodiment and which is solved by a memory device according to a second embodiment.

FIG. 9 is a diagram illustrating the problem which remains in the memory device 1 according to the first embodiment and which the memory device 1 according to the present embodiment will resolve.

FIG. 9 shows a situation where region data is present in the valid region a1 of the extended address space 130 in the memory device 1 according to the first embodiment, that is, a situation where region data addition processing is newly executed for the region number in which the region data is present in the cache. New region data is written at a location (region c1) pointed by the write pointer, but the old region data remains in the valid region a1 as a useless region (region c2). In this case, there is a problem that the cache hit rate declines since the valid region a1 of the cache effectively reduces.

Therefore, in the memory device 1 according to the present embodiment, information of the generated useless region is recorded in a table and the region where the old region data is written is reused to resolve this problem. Since the table size increases if all regions are reused all the time, such generated useless region is managed by a table in which the number of entries is fixed (for example, four or eight). Here, the new table is referred to as a fragment table 100B. The structure of the fragment table 100B is the same as the structure of the extended address table 100A, and the number of entries is fixed to a small value (for example, four entries or eight entries). The cache control circuit 111 may store the fragment table 100B in the cache memory 12 like the extended address table 100A, and storing in a memory incorporated in the controller 11 can reduce the control overhead. Unlike the extended address table 100A, the table size of the fragment table 100B is small, so that it is possible to store the fragment table 100B in a memory incorporated in the controller 11.

Figure 10:
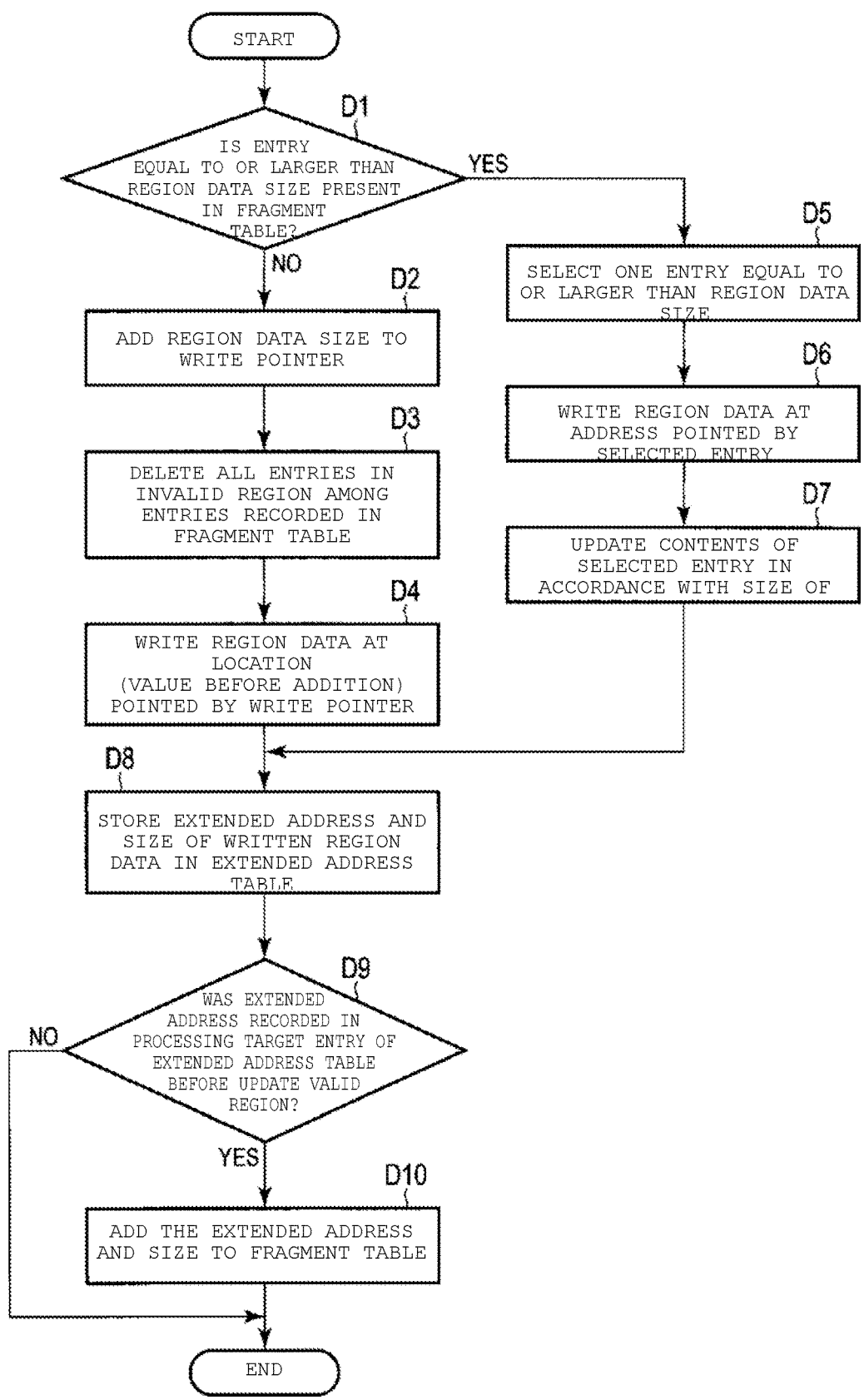
FIG. 10 shows a flowchart illustrating a flow of region data addition processing in the memory device according to the second embodiment.

FIG. 10 shows a diagram illustrating a flow of region data addition processing in the memory device 1 according to the present embodiment to which the fragment table 100B is added.

The cache control circuit 111 checks whether an entry equal to or larger than the size of the region data to be added is present in the fragment table 100B (step D1). When no entry satisfying the condition is present (step D1: NO), the cache control circuit 111 updates the write pointer (step D2). The processing of this step D2 is the same as the processing of the step A1 in FIG. 5 illustrated in the first embodiment. Since the valid region a1 shifts in accordance with the update of the write pointer, the cache control circuit 111 deletes, among the entries recorded in the fragment table 100B, all of the entries in the invalid region (step D3).

Then, the cache control circuit 111 writes region data (step D4). The processing of this step D4 is the same as the processing of the step A2 in FIG. 5 illustrated in the first embodiment.

In contrast, when entries satisfying the condition are present in the step D1 (step D1: YES), the cache control circuit 111 selects one entry among these entries (step D5). The cache control circuit 111 writes region data at a location pointed by the entry (step D6) and updates the entry of fragment table 100B (step D7). For example, the extended address of the entry of fragment table 100B is increased by the size of region data being added, and the size of the entry of fragment table 100B is reduced by the size of the region data being added.

Then, after the processing of the step D4 or the processing of the step D7 ends, the cache control circuit 111 stores the extended address and the size of the written region data in the extended address table 100A (step D8). The processing of this step D8 is the same as the processing of the step A3 in FIG. 5 illustrated in the first embodiment.

Subsequently, the cache control circuit 111 checks whether the target entry of the extended address table 100A had old region data included in the valid region a1 (step D9) and, if so (step D9: YES), records the extended address of the old region data and the size information of the extended address of the old region data in the fragment table 100B (step D10).

According to the second embodiment, it is possible to alleviate the problem of the useless region being generated in the data region of the cache. Further, it is possible to prevent an increase of overhead such as access to the cache memory 12 by reducing the size of the fragment table 100B.

That is, the memory device 1 according to the present embodiment can prevent a decline of the cache hit rate in addition to being capable of reducing the overhead of the cache control.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device comprising:
   a non-volatile first memory in which a conversion table is stored;
   a second memory; and
   a controller configured to control the first memory and the second memory, and including a cache control circuit configured to set up a circular buffer with a write pointer, and store portions of the conversion table in the circular buffer, wherein
   each of the portions of the conversion table contains a plurality of logical address to physical address mappings, and each of the portions has a corresponding entry in a management table stored in the second memory, and
   each entry of the management table includes an address field for storing an address of the circular buffer used in locating the corresponding portion of the conversion table and a size field for storing a size of the corresponding portion.

2. The memory device according to claim 1, wherein the cache control circuit advances the write pointer by a size of portion of the conversion table that is stored in the circular buffer upon storing the portion of the conversion table in the circular buffer.

3. The memory device according to claim 2, wherein the portion is in a compressed form.

4. The memory device according to claim 2, wherein
   the write pointer has a start address and an end address and a generation ID, and
   the cache control circuit returns the write pointer back to the start address while incrementing the generation ID by one if the write pointer advances to the end address, and resets the generation ID to zero if the incremented generation ID exceeds a maximum generation ID.

5. The memory device according to claim 4, wherein
   each entry of the management table further includes a generation ID field, and
   the cache control circuit stores the generation ID in the generation ID field upon storing the portion of the conversion table in the circular buffer.

6. The memory device according to claim 5, wherein
   the cache control circuit is configured to invalidate an entry of the management table corresponding to a first portion of the conversion table if the address field of the entry points to an address of the circular buffer at which the first portion of the conversion table has been overwritten by a second portion of the conversion table.

7. The memory device according to claim 1, wherein a fragment tracking table is stored in the second memory and the cache control circuit is configured to add an entry to the fragment tracking table when a first portion of the conversion table stored in a first location of the circular buffer is updated and stored in a second location of the circular buffer different from the first location.

8. The memory device according to claim 7, wherein the cache control circuit is configured to store a second portion of the conversion table at the first location of the circular buffer if a size of the second portion is less than or equal to a size of the first portion stored at the first location.

9. The memory device according to claim 1, wherein a fragment tracking table is stored in a third memory and the cache control circuit is configured to add an entry to the fragment tracking table when a first portion of the conversion table stored in a first location of the circular buffer is updated and stored in a second location of the circular buffer different from the first location.

10. The memory device according to claim 9, wherein the cache control circuit is configured to store a second portion of the conversion table at the first location of the circular buffer if a size of the second portion is less than or equal to a size of the first portion stored at the first location.

11. A method of managing a cache in a memory device comprising a non-volatile first memory in which a conversion table is stored, and a second memory, said method comprising:
 setting a circular buffer in the second memory as the cache, the circular buffer including a write pointer;
 storing portions of the conversion table in the circular buffer, wherein each of the portions of the conversion table contains a plurality of logical address to physical address mappings;
 setting up a management table stored in the second memory, wherein each of the portions of the conversion table has a corresponding entry in the management table, and each entry of the management table includes an address field for storing an address of the circular buffer used in locating the corresponding portion of the conversion table and a size field for storing a size of the corresponding portion.

12. The method according to claim 11, further comprising:
 advancing the write pointer by a size of the portion of the conversion table that is stored in the circular buffer upon storing portion of the conversion table in the circular buffer.

13. The method according to claim 12, wherein the portion is in a compressed form.

14. The method according to claim 12, wherein the write pointer has a start address and an end address and a generation ID, said method further comprising:
 returning the write pointer back to the start address while incrementing the generation ID by one if the write pointer advances to the end address; and
 resetting the generation ID to zero if the incremented generation ID exceeds a maximum generation ID.

15. The method according to claim 14, wherein each entry of the management table further includes a generation ID field, said method further comprising:
 storing the generation ID in the generation ID field upon storing the portion of the conversion table in the circular buffer.

16. The method according to claim 15, further comprising:
 invalidating an entry of the management table corresponding to a first portion of the conversion table if the address field of the entry points to an address of the circular buffer at which the first portion of the conversion table has been overwritten by a second portion of the conversion table.

17. The method according to claim 11, wherein a fragment tracking table is stored in the second memory, said method further comprising:
 adding an entry to the fragment tracking table when a first portion of the conversion table stored in a first location of the circular buffer is updated and stored in a second location of the circular buffer different from the first location.

18. The method according to claim 17, further comprising:
 storing a second portion of the conversion table at the first location of the circular buffer if a size of the second portion is less than or equal to a size of the first portion stored at the first location.

19. The method according to claim 11, wherein a fragment tracking table is stored in a third memory, said method further comprising:
 adding an entry to the fragment tracking table when a first portion of the conversion table stored in a first location of the circular buffer is updated and stored in a second location of the circular buffer different from the first location.

20. The method according to claim 19, further comprising:
 storing a second portion of the conversion table at the first location of the circular buffer if a size of the second portion is less than or equal to a size of the first portion stored at the first location.

* * * * *